United States Patent [19]
Vanden Broek et al.

[11] 4,099,881
[45] Jul. 11, 1978

[54] VIEWER FOR BIOLOGICAL DIFFUSION PLATE

[75] Inventors: Jan A. Vanden Broek; James A. Carney, both of Ann Arbor, Mich.

[73] Assignee: Transidyne General Corporation, Ann Arbor, Mich.

[21] Appl. No.: 614,875

[22] Filed: Sep. 19, 1975

[51] Int. Cl.² .................. G01B 11/02; G01N 21/16
[52] U.S. Cl. ........................ 356/171; 195/103.5 R; 350/10; 350/238; 356/157; 356/244
[58] Field of Search ............ 356/157, 171, 244, 247, 356/252; 195/103.5 R; 350/10, 238, 159; 33/246, 248, 297, 298

[56] References Cited

U.S. PATENT DOCUMENTS

| | | | |
|---|---|---|---|
| 2,241,690 | 5/1941 | Williams | 356/171 |
| 2,577,069 | 12/1951 | Brewer | 356/171 |
| 3,546,778 | 12/1970 | Lepkowski | 33/297 |
| 3,652,169 | 3/1972 | Danti et al. | 356/171 |
| 3,712,746 | 1/1973 | Bergeron | 356/244 |

FOREIGN PATENT DOCUMENTS 1,228,862   4/1971   United Kingdom ............. 350/159

Primary Examiner—Vincent P. McGraw
Attorney, Agent, or Firm—Krass & Young

[57] ABSTRACT

A viewer for observing and measuring the diameter of diffusion rings occurring on immuno-diffusion plates employs a magnifying lens for observing the plate and a baffled back lighting system for illuminating the plate so that light diffused by the plate is visible through the lens against a dark field. A beam splitter supported between the lens and the plate superimposes an image of a pair of illuminated filaments on the image of the plate seen through the lens. Manual mechanism allows the spacing of the filaments to be adjusted by the observer to bring them to the diameter of a diffusion ring. A digital display connected to the adjustment system provides a read-out of the filament spacing and thus the diameter of the immuno-diffusion ring.

6 Claims, 4 Drawing Figures

VIEWER FOR BIOLOGICAL DIFFUSION PLATE

BACKGROUND OF THE INVENTION

1. Field of the Invention

This invention relates to a viewer for diffusion plates which provides magnified dark-field viewing of the plates and includes means for optically measuring the diameter of rings on the plate.

2. Prior Art

Immuno-diffusion plates are commonly used to quantitate constituents of blood and other body fluids. The unknown specimen is applied to a narrowly defined area of a plate coated with a gel and reacts with the unknown to form a precipitate. As the unknown diffuses radially from its point of deposit a ring of precipitate is formed by the reaction of the unknown with the gel and the dimensions of this ring can be related to the quantity of the unknown in the sample, typically by comparison with the dimensions of rings produced by samples containing known quantities of the constituent in question.

In the past the dimensions of these rings have typically been measured employing plastic scales or grids which are positioned directly above the ring. These scales cannot be placed in contact with the plate or they will damage the fragile gel. Their use accordingly tests the agility and visual acuity of the observer and the readings obtained are limited in precision because of the parallax resulting from the necessary spacing between the scale and the plate and the ability of the observer to make an accurate reading without a magnified scale.

Other prior art systems use a magnifier and a graduated reticle. Like the scale, the reticle is supported in close proximity to the plate but in a different plane, producing both focusing and parallax problems.

These prior art devices also relied on the observer's ability to distinguish the bounds of the diffusion ring which is substantially the same color as the surrounding gel and may only be distinguished on the basis of its slightly higher optical diffusing properties. These problems render the prior art devices difficult to use, of limited accuracy and highly susceptible to erroneous readings.

SUMMARY OF THE INVENTION

The present invention is directed toward apparatus for viewing immuno-diffusion plates and the like and measuring their diffusion rings, which overcomes these problems of the prior art and yet is sufficiently simple as to be relatively low in cost and reliable in operation. The viewer of the present invention overcomes the difficulty of distinguishing the diffusing ring from surrounding gel by illuminating the plate from the side opposite the viewing window with light that strikes the plate at an angle with respect to the plane of the plate from an illumination source that is not directly visible from the viewing area. The only light visible from the viewing area is the light diffused by the gel and the ring. Since the ring has a higher degree of optical diffusion than the gel it appears through the viewer as a relatively bright ring on a dark background so that no difficulty is encountered in observing the boundaries of the ring.

The viewer employs a magnifying lens and a support stage for the plate which is movable toward and away from the lens so that the plate may be disposed in the focal plane of the lens.

The measuring system employs a pair of stretched plastic threads, supported parallel to one another, one on a fixed frame and the other on a frame movable along a line normal to the extension of the thread so that its distance from the fixed thread may be adjusted. The threads are sandwiched between a pair of polarized filters arrayed with their optical axes normal to one another. A light bulb illuminates the threads through one of the polarized filters. The two filters combine to block any light passing through the second filter but the threads depolarize light intersecting them. Accordingly, when the threads are viewed through the filter on the side opposite the illumination source they appear as two bright lines on a dark background.

A half-silvered mirror or beam-splitter is supported between the viewing lens and the diffusion plate to combine the image of the illuminating threads with the image of the plate as seen through the viewer. The distance of the threads from the beam splitter is such that the threads appear in the focal plane of the lens, superimposed on the diffusion plate. The plate may be moved so that the fixed thread is tangent to one end of a diffusion ring and the position of the other thread is then adjusted so that it appears tangent to the opposite edge of the ring. A digital counter is provided controlled by the thread adjustment means to provide a read-out equal to the diameter of the ring being observed.

The viewer of the present invention is simple to use and allows relatively unskilled personnel to obtain highly accurate readings.

Other objectives, advantages and applications of the present invention will be made apparent by the following detailed description of a preferred embodiment of the invention. The description makes reference to the accompanying drawings in which.

Figure 1:
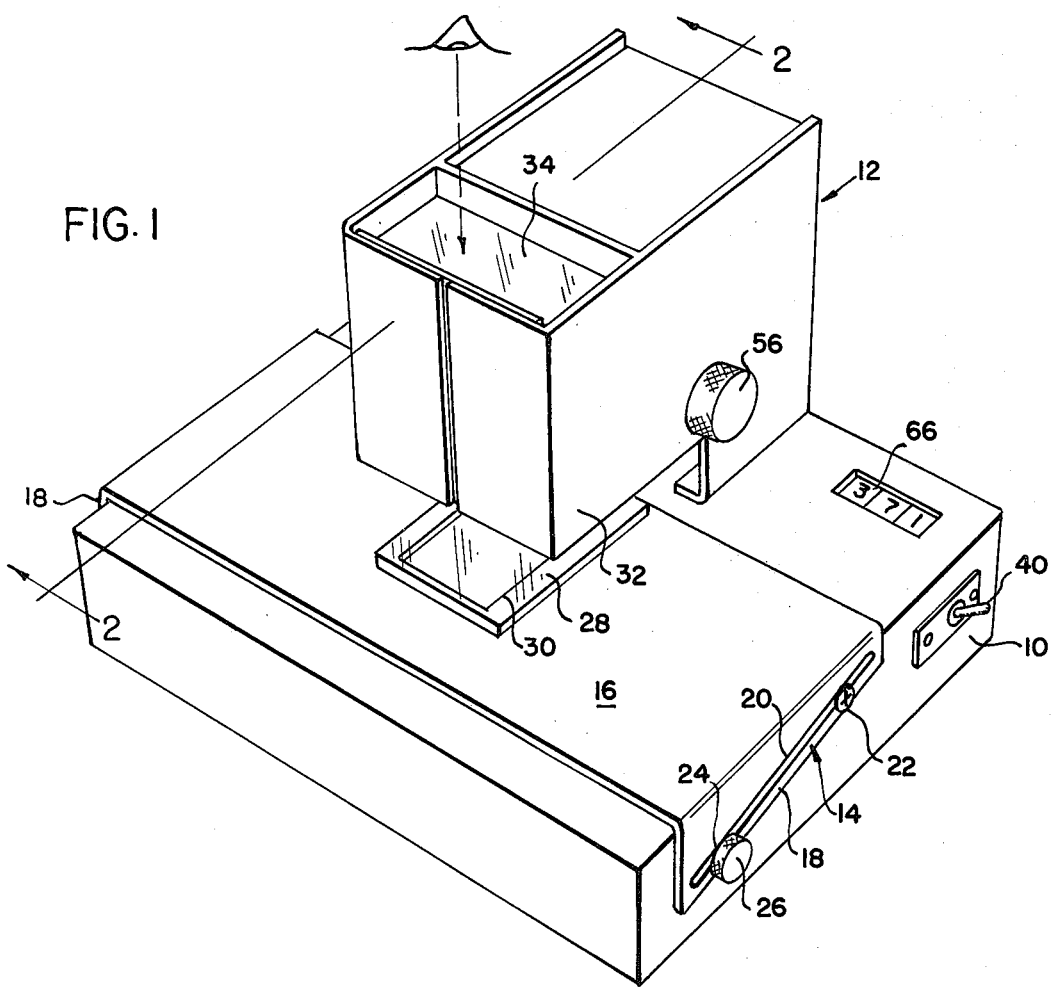
FIG. 1 is a perspective view of a preferred embodiment of our invention.
Figure 2:
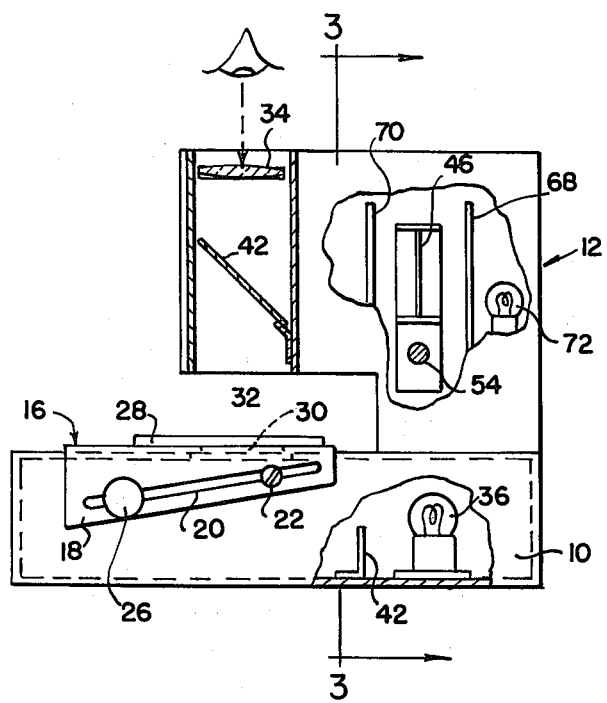
FIG. 2 is an elevational sectional view of the preferred embodiment, taken along line 2—2 of FIG. 1.
Figure 3:
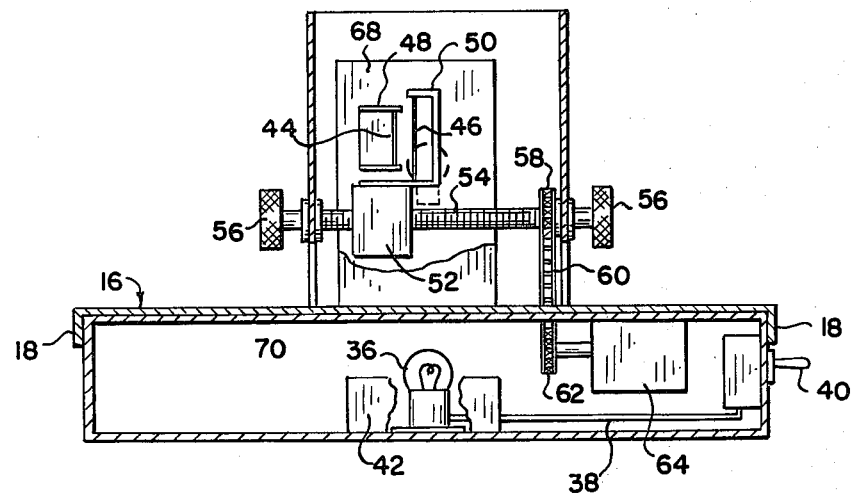
FIG. 3 is an elevational sectional view through the adjustable indicia mechanism taken along line 3—3 of FIG. 2.

Referring to the drawings, the preferred embodiment of the viewer employs a base 10 taking the form of a low rectangular box formed of sheet metal. The base 10 supports a viewing tower generally indicated at 12 and an adjustable plate support generally indicated at 14.

The plate support 14 consists of a sheet metal section 16 having a length slightly greater than the width of the base 10 and having a pair of normally bent end sections 18, which project downwardly over the sides of the base. Elongated slots 20 are formed in both of the bent sections 18 at an angle with respect to the main support section 16. Screws 22 project through the slots 20 and are fixed in the sides of the base 10. The heads of the screws 22 are outside of the bent sections 18 and act to slidably retain the plate support with respect to the base. Another pair of screws 24 having adjustment knobs 26 at their heads pass through the slots 20 and are threaded in the base. A line between the screws 22 and 24 makes the same angle with respect to the top of the base as the slot 20 makes with respect to the planar section 16 of the plate support. Accordingly, when the knobs 26 are loosened so that the plate support 16 can be moved with respect to the base, its motion tends to raise and lower the section 16 with respect to the top of the base.

A central hole 28 is formed in the top of the base 10 and a somewhat smaller hole 30 is formed in the support plate 16. The hole 30 in the support plate is centered over the hole 28 in the base.

The viewing tower 12 includes a cantilevered section 32 which projects over the hole 28. This cantilevered section supports a double concave lens 34 near its upper end so that the plane of the lens is substantially parallel to the base. The underside of the cantilevered section is open so that the sides act as a baffle tube for the lens. The focal plane of the lens 34 is slightly above the upper surface of the base.

In use, a transparent immuno-diffusion slide is positioned over the hole 30 in the support plate and the support plate is moved relative to the base 10 until the observer sees the immuno-diffusion plate in focus when viewing through the lens 34. The knobs 24 are then rotated to lock the support 14 in position.

An immuno-diffusion plate thus supported is illuminated by an electric lamp 36 supported within the base. Electric power for the lamp is provided through a line cord 38 and an on/off switch 40 on the side of the base 10 controls illumination of the lamp. The lamp 35 illuminates the underside of an immuno-diffusion plate supported over the opening 30 in the support 16. A baffle 42 which extends upwardly from the bottom of the base 10 between the lamp 36 and the opening 28 acts in connection with the base surface to prevent an observer viewing through the lens 34 from receiving any direct illumination from the lens. However, the diffusing action of the reaction rings projects light upwardly to lens 34 and renders a magnified image of these rings clearly visible against a dark background when viewed through the lens.

A partially reflecting mirror 42 is positioned between the lens 34 and the plate support 14 at an angle of 45° and acts as a beam splitter to superimpose a pair of parallel straight lines on the plate image, which lines may be used to measure the diameter of a reaction ring visible through the lens. The line images are derived from a pair of plastic filaments 44 and 46 supported within the viewing tower 12. The filament 44 is supported in a fixed position vertically in a frame member 48. The filament 46 is supported vertically in a frame 50 that is attached to a nut 52. The nut is threaded on a horizontal screw 54 so that the nut and the filament 46 move horizontally as the screw 54 is rotated. A shaft forming the end of the screw 54 projects out of the viewer housing 12 and both ends terminate in knobs 56. By rotating the knobs the spacing between the movable filament 46 and the fixed filament 44 may be adjusted.

A cog 58 affixed to the threaded shaft 54 drives a chain belt 60 in timed relation to the rotation of the shaft. The belt extends into the base 10 where it drives a cog 62 affixed to the shaft of a three-bit digital counter 64. The window 66 of the counter is visible through a hole in the top of the base 10 and provides a three digit numerical indication of the distance between the filaments 44 and 46.

The filaments 44 and 46 are sandwiched between a pair of parallel spaced polarized filters 68 and 70. The filters are positioned so that their optical axes are normal to one another and preferably each extends at approximately 45° to the alignment of the filaments.

An incandescent lamp 72 is positioned on the opposite side of the filter 58 from the filaments. This lamp is powered through the line cord and controlled by the switch 40. Since the two polarized filters with the normally aligned axes of polarization 68 and 70 are disposed between the lamp 72 and the beam splitter 42, the lamp is not visible through the lens 34. However, the two filaments 44 and 46 act to depolarize light reaching them from the lamp 72 through the first filter 68. Accordingly, light from these two filaments passes through the second polarized filter 70 and is reflected by the mirror 42 to the lens 34. The spacing of the filaments from the beam splitter 42 is equal to the spacing of the focal plane of the lens 34 from the beam splitter and accordingly the images of the two filaments appear in focus and superimposed on the image of an immuno-diffusion plate supported in the focal plane of the lens.

In use, the switch 40 is closed to energize the lamps 36 and 72. An immuno-diffusion plate 74 is then placed on the support 14 so that its central section extends over the hole 30. The operator observes the plate from above, through the lens 34, and after loosening the knob 26 adjusts the height of the plate support 14 until the plate is in focus in the lens. The knobs 26 are then rotated to lock the support in position.

Figure 4:
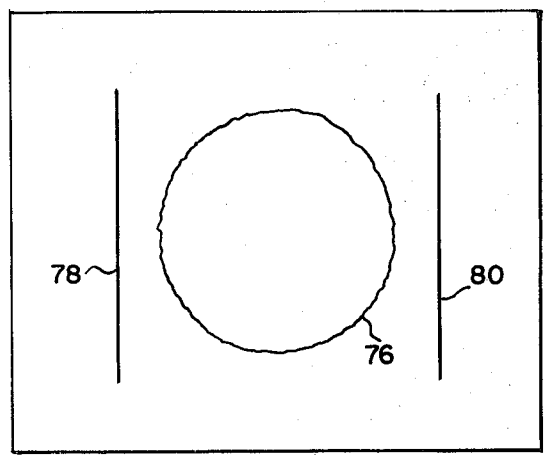
FIG. 4 is a view of an immuno-diffusion plate with the indicia superimposed thereon, as seen through the viewer.

The plate 74 is then moved until one outer edge of a reaction ring 76, illustrated in FIG. 4, is tangent to the image 78 of the fixed filaments 44. The knobs 56 are then rotated until the image 80 of the movable filaments 46 are tangent to the opposite edge of the ring 76. The spacing of the filaments, and thus the diameter of the reaction ring is visible on the indicator 66. The image of the ring and the filaments is the same independent of the angle at which the observer views through the lens 34; both the images of the filaments and the image of the rings appear in the same plane and nothing actually touches the delicate reaction ring.

Having thus described our invention, we claim:

1. Apparatus for viewing and measuring an area having a relatively high optical diffusion characteristic occurring on a plate having a relatively low diffusion characteristic, comprising: a support for the plate; a viewing area fixed relative to the support; a source of light operative to illuminate the side of a plate opposite to the side facing said viewing area; baffle means disposed between the viewing area and the illumination source operative to prevent an observer viewing the plate through the viewing area from seeing direct light from the source; measuring indicia, including a fixed line and a movable line, supported parallel to the fixed line and adjustable in a direction normal to both lines, said indicia being supported so that an observer viewing the plate from the viewing area cannot observe the indicia; and an optical element supported between the viewing area and the plate for rendering the indicia visible through the viewing area so as to be superimposed on the image of the plate seen through the viewing area by an observer.

2. The apparatus of claim 1 including adjustment means for moving the adjustable indicia member relative to the fixed indicia member and digital display means for indicating the setting of the adjustment means.

3. The apparatus of claim 1 wherein said optical element comprises a beam splitter.

4. The apparatus of claim 1 wherein said indicia are formed by a pair of elongated illuminated elements supported parallel to one another.

5. The apparatus of claim 1 wherein said indicia comprise a pair of translucent filaments supported parallel to one another and a light source for illuminating said filaments.

6. The apparatus of claim 5 further including a pair of polarized filters disposed parallel to one another on opposite sides of the filaments, one between said illumination source and the filaments, the filters having their polarized axes disposed normally to one another.

* * * * *